(12) United States Patent
Meyer et al.

(10) Patent No.: US 7,007,873 B2
(45) Date of Patent: Mar. 7, 2006

(54) PROCESS AND MEANS FOR DISINTEGRATING COMPRESSED MATERIAL BALES

(75) Inventors: Joachim Meyer, Twistringen (DE); Frank Stöver, Twistringen (DE)

(73) Assignee: mst-Maschinenbau GmbH, (DE)

( * ) Notice: Subject to any disclaimer, the term of this patent is extended or adjusted under 35 U.S.C. 154(b) by 115 days.

(21) Appl. No.: 10/814,456

(22) Filed: Mar. 31, 2004

(65) Prior Publication Data

US 2005/0139702 A1 Jun. 30, 2005

(30) Foreign Application Priority Data

Dec. 31, 2003 (DE) ................ 103 15 844

(51) Int. Cl.
*B02C 19/12* (2006.01)
(52) U.S. Cl. .................. 241/19; 241/79.1; 241/605
(58) Field of Classification Search .................. 241/19, 241/79.1, 605
See application file for complete search history.

(56) References Cited

U.S. PATENT DOCUMENTS 5,395,062 A * 3/1995 Von Gehlen et al. ... 241/101.71
5,590,839 A * 1/1997 Condrey ....................... 241/27

FOREIGN PATENT DOCUMENTS

| DE | 24 16 944 | | 4/1974 |
|---|---|---|---|
| DE | 29 14 676 | | 4/1979 |
| DE | 36 44 535 | A1 | 12/1986 |
| DE | 40 38 685 | A1 | 12/1990 |
| DE | 41 20 818 | A1 | 6/1991 |
| DE | 44 22 574 | A1 | 6/1994 |
| DE | 195 10 215 | A1 | 3/1995 |
| DE | 199 57 548 | A1 | 11/1999 |

* cited by examiner

*Primary Examiner*—Mark Rosenbaum
(74) *Attorney, Agent, or Firm*—Husch & Eppenberger, LLC

(57) ABSTRACT

The invention relates to a process for disintegrating compressed bales of coarse, fiberlike, natural or synthetic materials, especially straw bales, and transporting the disintegrated materials to further processing. Bales often contain foreign objects which the invention removes from disintegrated bale material by moving the material disintegrated from the compressed bales to a feeding and collecting auger and sucking off the portions of natural or synthetic fiber intended for further processing from the feeding and collecting auger, while the contaminants collected are moved on by the feeding and collecting auger and discharged.

15 Claims, 3 Drawing Sheets

PROCESS AND MEANS FOR DISINTEGRATING COMPRESSED MATERIAL BALES

CROSS-REFERENCE TO RELATED APPLICATIONS

This application claims priority to German patent application DE 103 15 844.8, filed Mar. 31, 2003.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The invention concerns a process and a means for disintegrating compressed material bales of coarse, fiber-like natural or synthetic materials, especially straw bales, and for sending the disintegrated fiber materials on for their intended further processing.

Mats are used to protect against erosion at many locations. They prevent erosion of dirt on large open areas, such as those remaining after earth-moving operations. They also protect areas of earth fill and accelerate plant growth on them. Building regulations may require that such mats be used to protect the ground. These anti-erosion mats are made of a net-like supporting layer and a fiber layer of synthetic or natural fibers such as coconut fibers or straw, which are combined in special machines using sewing, stitching or linking machines, which are themselves known.

Straw bales in particular often contain foreign objects such as stones, pieces of wood, pieces of metal or other contaminants which are picked up by the straw balers when the straw is recovered and which are compressed into straw bales together with the short and long straw. When the bales are broken up, these foreign objects and contaminants are also removed. They accompany the flow of fibers of long and short straw to a transport auger. At the outlet of the auger there is a radial blower which moves the broken up and separated materials to the machines and systems which process the straw into anti-erosion mats. In that feed process, the foreign objects and contaminants gain very high kinetic energy, so that they cause substantial damage to the feed equipment and the production equipment, and to the product itself. Long down-times and losses of production are unavoidable consequences.

2. Related Art

Processes and means for removing fiber flocs from a bale of textile fibers, such as cotton or synthetic fibers, are already generally known. They are described in, for instance, DE 41 20 818 A1 and DE 44 22 574 A1.

A device for opening and mixing of fiber bales is known from DE OS 24 16 944. With that device, the fiber bales are broken down with a toothed or wire roller. Then the fiber flocs are moved to a discharge space. They are moved out of that space by means of an air flow produced by blowers through a discharge line to a collector or to a machine for further processing of the fibers. In the discharge space there is a transport auger which slopes up to the discharge line so that the fiber flocs are carried away without damage, independently of the position of the discharge line.

DE OS 29 14 576 describes a device for opening a fiber bale and separating the fibers, in which the fibers are again abraded from the bales by suitable grinding tools. A pneumatic feed is provided to move the fibers falling from the grinding tool in their separated state to a discharge funnel. The pneumatic feed comprises a perforated floor plate through which the air flows and which transports the fibers to a discharge funnel. All the suggested solutions refer to separation and removal of cotton fibers and similar fibers, which have relatively low masses and so can be transported relatively easily to the machines and systems for their further processing. Furthermore, those fibers are removed from fiber bales which are relatively free of foreign objects and contaminants. Therefore these solutions are not usable or transferable to solve the problem initially stated.

According to DE 36 44 535 A1, the separated fiber flocks are piled loosely on a conveyor belt, and that pile is examined with an electronic device that searches for foreign objects, to detect foreign objects such as foreign fibers, binding twine, plastic tapes, wires, and the like. On detection of a foreign object, means are activated which remove the portion of the pile of flock in which the foreign object has been detected from the loose fiber pile. This suggestion assures exact detection of foreign objects, but the equipment is relatively expensive. The relatively high cost is not in proportion to that of the relatively simple machines and systems used to process straw into anti-erosion mats. Aside from that, there are heavy dust loads when straw bales and straw are processed. That requires extra protection of the electronic components of such a foreign object detection device. The solution of DE 36 44 535 A1 is not usable for systems and equipment for producing anti-erosion mats using natural or synthetic fibers compressed into bales.

DE 40 38 685 A1 describes a means for processing bales of staple fiber having contamination, such as oil, clay, and the like on the surface of the bales. According to DE 40 38 685 A1, the cleaning device used for this purpose is in contact with the surface of the bale and can be moved relative to that surface. The cleaning device has a cleaning roll which acts as a high-speed dressing roll and grinds the contamination off the surface of the bale. That solution can only remove superficial contamination from the bale surface. That solution is not applicable for foreign objects and contaminants compressed inside the fiber bale along with the fibers.

SUMMARY OF THE INVENTION

The invention is based on the problem of developing a simple and economical solution with which foreign objects and contaminants which are carried along with the material flow when the compressed bales are broken up can be selected and removed from the materials intended for further processing.

By means of the invention, in the process of disintegrating the compressed material bales and transporting the materials removed from the bales, contaminants are selected and separated by relatively simple means from materials intended for further processing. In the process, the flow of material produced by disintegrating the bales is fed to a feeding and collecting auger and the synthetic or natural fiber portions of the material stream intended for further processing are sucked out of the feeding and collecting auger, while the contaminants carried along into the feeding and collecting auger are transported on and removed through a chute at the output of the feeding and collecting auger. This process makes sure that only the portions of the material intended for further processing are fed to the machines and systems provided for that purpose, and that no foreign objects or other contaminants are carried along with the material flow drawn off.

According to a further feature of the invention, the separation between the suction system and the feeding and collecting auger is made so as to be adjustable, so that the intensity of the suction air and the material flow of the portions of the materials intended for further processing can be regulated by a freely selectable position of the suction system. A further possibility for controlling the intensity of the suction air and of the material flow consists of changing the speed of rotation of the blower in the suction system.

A continuous production process, without problems related to the straw feed, can be achieved with the suggested solutions, especially for production of anti-erosion mats using straw. At the same time, the invention contributes to assurance of a constant high product quality, while the cost of the suggested material feed system are low, without exception.

BRIEF DESCRIPTION OF THE DRAWINGS

The invention will be explained in the following, by means of an example embodiment. The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
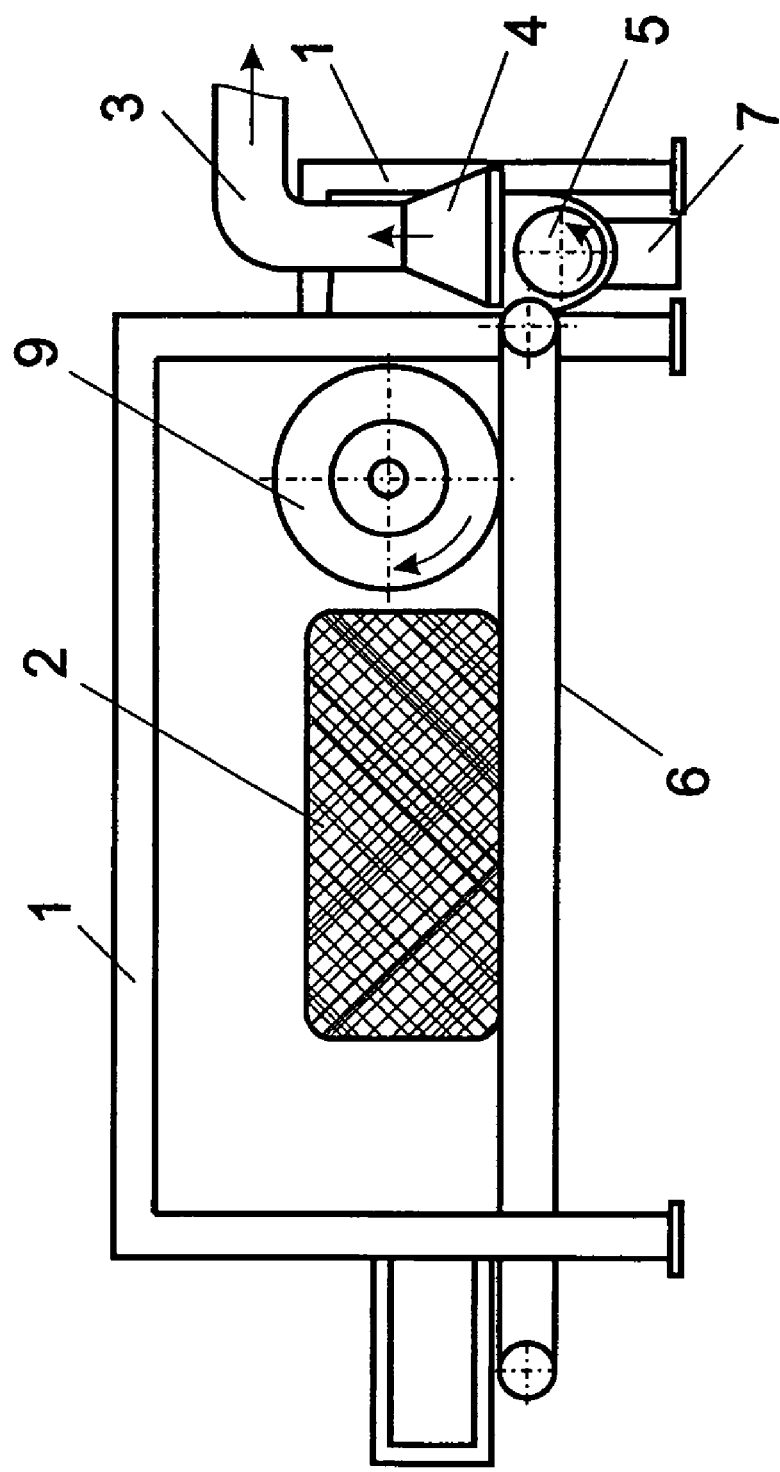
FIG. 1 shows a schematic side view of the means provided to carry out the process according to the invention.
Figure 2:
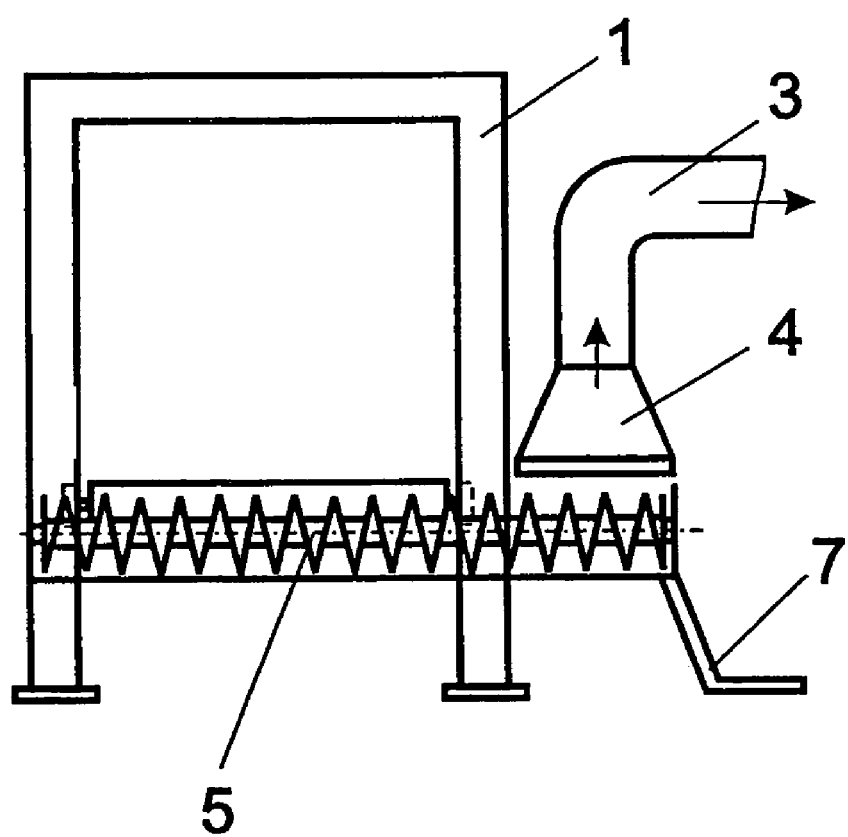
FIG. 2 shows the view of FIG. 1 from the right.
Figure 3:
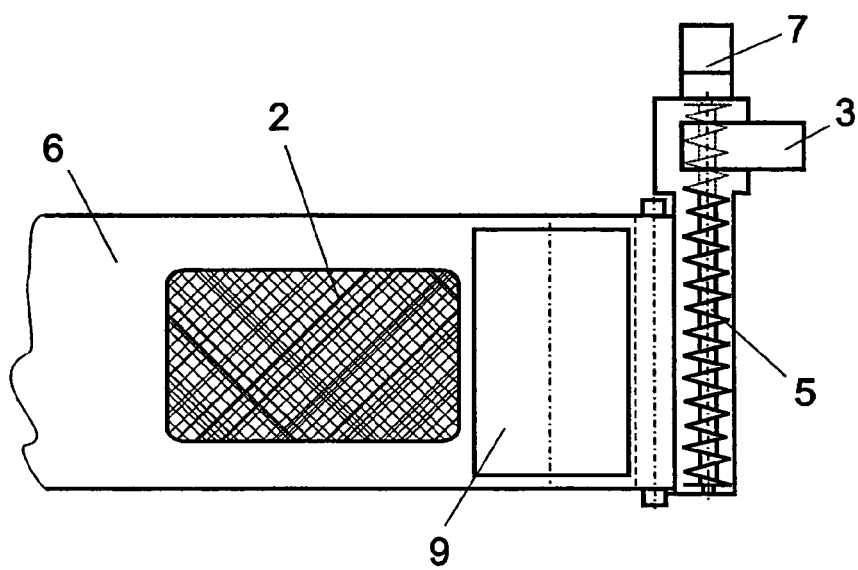
FIG. 3 shows a partial representation of the plan view of FIG. 1.

Reference number 1 indicates a machine frame characterized by having a conveyor belt 6 to hold a material bale 2, which in the present example is a bale of straw, which is to be disintegrated by means of a beater roll 9 for production of anti-erosion mats. The materials separated from the material bales 2 consist of short and long straw, foreign objects, and other contaminants. In the direction of flow of the separated materials (2), at the place where the conveyor belt (6) changes its direction, there is a feeding and collecting auger 5. The materials from the disintegrated compressed bales which enter the feeding and collecting auger 5 are carried on toward the discharge chute 7 of the feeding and collecting auger 5. During that phase of transport, the portions of natural or synthetic fibers provided for further processing are drawn off by the suction system 4 and are fed through the outlet 3 to the equipment for producing the anti-erosion mats, while the contaminants and foreign objects carried along remain in the feeding and collecting auger 5. They are carried along the remaining transport path and finally removed from the system through the discharge chute 7.

A relatively simple and economical means assures that the foreign objects and other contaminants contained within the material bales 2 are separated and removed from the materials intended for further processing during the transportation of the disintegrated materials in the feeding and collecting auger 5. That prevents the foreign objects and contaminants being carried along in the material flow for further processing.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A process for disintegrating compressed bales of material comprising:
    a bale disintegration station having a conveyor;
    a material separation station;
    a bale disintegration device disposed to receive a bale from said conveyor and to feed disintegrated material and foreign objects to said material separation station;
    a suction system disposed in relation to said material separation station to remove disintegrated material from said material separation station and transport the disintegrated material through a material outlet; and
    an auger disposed in relation to said material separation station such that foreign objects are transported to a contaminate outlet.

2. The process according to claim 1, wherein said bale disintegration device is a beater roll.

3. The process according to claim 1, wherein the intensity of the suction of said suction system is selectively variable.

4. The process according to claim 3 wherein the intensity of the suction of said suction system is selectively variable by controlling the position of the suction system relative to said auger.

5. The process according to claim 3 wherein the intensity of the suction of said suction system is selectively variable by controlling the blower of the suction system.

6. The process according to claim 1 wherein said auger is at the point of reversal of the conveyor belt.

7. The process according to claim 1 wherein said suction system is placed above said auger.

8. The process according to claim 1 wherein said material outlet of the suction system is connected to a further processing apparatus for further processing the disintegrated materials.

9. The process according to claim 1 wherein said suction system is adjustable in relation to the feeding and collecting auger.

10. The process according to claim 1 wherein said material outlet includes a discharge chute.

11. The process according to claim 1 wherein the compressed bales of material are straw bales.

12. The process according to claim 1 wherein the compressed bales of material are coarse fiber-like materials.

13. The process according to claim 1 wherein the compressed bales of material are synthetic materials.

14. The process according to claim 1 wherein the compressed bales of material are natural materials.

15. The process according to claim 1 wherein the material is discharged from said material outlet as an anti-erosion mat.

* * * * *